(12) United States Patent
Cardente et al.

(10) Patent No.: US 9,621,431 B1
(45) Date of Patent: Apr. 11, 2017

(54) CLASSIFICATION TECHNIQUES TO IDENTIFY NETWORK ENTITY TYPES AND DETERMINE NETWORK TOPOLOGIES

(71) Applicant: EMC Corporation, Hopkinton, MA (US)

(72) Inventors: John Cardente, Milford, MA (US); Kenneth Durazzo, San Ramon, CA (US); Jack Harwood, Paxton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 90 days.

(21) Appl. No.: 14/581,201

(22) Filed: Dec. 23, 2014

(51) Int. Cl.
*H04L 12/28* (2006.01)
*H04L 12/24* (2006.01)

(52) U.S. Cl.
CPC ............ *H04L 41/12* (2013.01); *H04L 41/147* (2013.01)

(58) Field of Classification Search
None
See application file for complete search history.

(56) References Cited

U.S. PATENT DOCUMENTS

| | | | |
|---|---|---|---|
| 5,287,500 A | 2/1994 | Stoppani, Jr. | |
| 5,933,416 A * | 8/1999 | Schenkel | H04L 41/12 370/248 |
| 6,430,612 B1 * | 8/2002 | Iizuka | H04L 41/0893 709/220 |
| 6,639,900 B1 * | 10/2003 | Anstey | H04L 41/16 370/254 |
| 7,870,246 B1 * | 1/2011 | Davis | H04L 41/12 709/220 |
| 8,458,301 B1 * | 6/2013 | Andrus | H04L 41/0816 709/220 |
| 9,037,701 B1 * | 5/2015 | Sarihan | H04L 41/12 709/224 |
| 9,113,286 B1 * | 8/2015 | Adams | G06Q 30/0623 |
| 9,306,806 B1 * | 4/2016 | Zhang | H04L 41/0866 |
| 9,319,911 B2 * | 4/2016 | Gupta | H04W 24/08 |
| 2003/0061491 A1 | 3/2003 | Jaskiewicz et al. | |
| 2004/0085347 A1 * | 5/2004 | Hagarty, Jr. | H04L 41/22 715/735 |

(Continued)

OTHER PUBLICATIONS

S. Zander et al., "Automated Traffic Classification and Application Identification Using Machine Learning," The IEEE Conference on Local Computer Networks (LCN), 30th Anniversary, Nov. 2005, pp. 250-257.

(Continued)

*Primary Examiner* — Steven H Nguyen
(74) *Attorney, Agent, or Firm* — Ryan, Mason & Lewis, LLP

(57) ABSTRACT

Classification techniques are employed in computer networks. For example, network activity is monitored in a computer network and the monitored network activity is used to discover an endpoint of unknown type. A first set of classification models is utilized to identify an endpoint type of the discovered endpoint based on the monitored network activity. In addition, communication patterns between different endpoints of known types are monitored in the computer network, and a second set of classification models is utilized to determine a logical topology of the computer network based on the monitored communication patterns.

17 Claims, 4 Drawing Sheets

(56) References Cited

U.S. PATENT DOCUMENTS

| | | | | |
|---|---|---|---|---|
| 2005/0036500 | A1* | 2/2005 | Rodeheffer | H04L 12/462 370/401 |
| 2006/0007911 | A1* | 1/2006 | Hankins | H04L 45/00 370/351 |
| 2007/0250930 | A1* | 10/2007 | Aziz | G06F 21/554 726/24 |
| 2008/0049644 | A1* | 2/2008 | Halbert | H04L 41/12 370/254 |
| 2008/0068635 | A1* | 3/2008 | Asano | G06F 3/1204 358/1.13 |
| 2008/0123559 | A1* | 5/2008 | Haviv | G06F 8/61 370/255 |
| 2009/0119256 | A1* | 5/2009 | Waters | H04L 41/5064 |
| 2009/0119280 | A1* | 5/2009 | Waters | G06F 17/30864 |
| 2010/0241698 | A1 | 9/2010 | Hillerbrand | |
| 2010/0315975 | A1* | 12/2010 | Arkin | H04L 41/12 370/254 |
| 2012/0226791 | A1* | 9/2012 | Ramaswamy | H04L 41/12 709/223 |
| 2013/0246603 | A1* | 9/2013 | Davis | H04L 29/12216 709/224 |
| 2014/0180738 | A1 | 6/2014 | Phillipps et al. | |
| 2014/0334304 | A1 | 11/2014 | Zang et al. | |
| 2015/0026318 | A1* | 1/2015 | Faraboschi | H04L 41/145 709/221 |
| 2015/0063771 | A1* | 3/2015 | Mogul | G02B 6/43 385/135 |

OTHER PUBLICATIONS

S.B. Kotsiantis, "Supervised Machine Learning: A Review of Classification Techniques," Informatica, Jul. 2007, pp. 249-268, vol. 31.
E. Guttman, "Service Location Protocol: Automatic Discovery of IP Network Services," IEEE Internet Computing, http://computer.org/internet/, Jul.-Aug. 1999, pp. 71-80.
Wikipedia, "OSI Model," http://en.wikipedia.org/wiki/OSI_model, Dec. 2014, 9 pages.
Wikipedia, "Ethernet," http://en.wikipedia.org/wiki/Ethernet, Dec. 2014, 7 pages.
Wikipedia, "MAC Address," http://en.wikipedia.org/wiki/MAC_address, Dec. 2014, 5 pages.
Wikipedia, "Internet Protocol," http://en.wikipedia.org/wiki/Internet_Protocol, Dec. 2014, 6 pages.
Wikipedia, "Address Resolution Protocol," http://en.wikipedia.org/wiki/Address_Resolution_Protocol, Dec. 2014, 7 pages.
Wikipedia, "Router," http://en.wikipedia.org/wiki/Router, Jul. 2014, 1 page.
Wikipedia, "Border Gateway Protocol," http://en.wikipedia.org/wiki/Border_Gateway_Protocol, Dec. 2014, 13 pages.
Wikipedia, "Trunking," http://en.wikipedia.org/wiki/Trunking, Dec. 2014, 4 pages.
Wikipedia, "Transmission Control Protocol," http://en.wikipedia.org/wiki/Transmission_Control_Protocol, Dec. 2014, 19 pages.
Wikipedia, "User Datagram Protocol," http://en.wikipedia.org/wiki/User_Datagram_Protocol, Nov. 2014, 6 pages.
Wikipedia, "Domain Name System," http://en.wikipedia.org/wiki/Domain_Name_System, Dec. 2014, 18 pages.
Wikipedia, "Round-Robin DNS," http://en.wikipedia.org/wiki/Round-robin_DNS, Jun. 2014, 2 pages.
Wikipedia, "Passive Monitoring," http://en.wikipedia.org/wiki/Passsive_monitoring, Apr. 2013, 2 pages.
Wikipedia, "Data Packet Inspection," http://en.wikipedia.org/wiki/Deep_packet_inspection, Nov. 2014, 12 pages.

* cited by examiner

CLASSIFICATION TECHNIQUES TO IDENTIFY NETWORK ENTITY TYPES AND DETERMINE NETWORK TOPOLOGIES

FIELD

The field relates generally to computer networks, and in particular, to classification techniques employed in computer networks.

BACKGROUND

In recent years, there has been an exponential growth in the implementation and use of network computing systems such as cloud computing platforms and data centers, for example, to support various types of network applications and services. These network computing systems may be comprised of tens, hundreds, or thousands or more of interdependent network entities including logical, physical and/or virtual entities. Because of the complexity and potential vast size of such network computing systems, the ability to identify and manage the constituent components of such systems is not trivial for various reasons. For example, the infrastructure of a given network computing system can dynamically change on a regular basis, wherein different network entities are physically added and removed, and/or logically or virtually instantiated, for example. As such, it is difficult to track what components are executing in the network computing system at any given time, and where such components are located in the system. Moreover, a network computing system with a dynamically changing topology makes it problematic to discover and track the behavior of the network entities within the system to ensure that the network entities are behaving appropriately in terms of performance, security, and other expected or desired behaviors.

SUMMARY

Illustrative embodiments of the invention provide classification techniques for use in computer networks. For example, in one embodiment of the invention, network activity is monitored in a computer network and the monitored network activity is used to discover an endpoint of unknown type. A first set of classification models is utilized to identify an endpoint type of the discovered endpoint based on the monitored network activity. In addition, communication patterns between different endpoints of known types are monitored in the computer network, and a second set of classification models is utilized to determine a logical topology of the computer network based on the monitored communication patterns.

In another embodiment of the invention, the monitored network activity is used to discover an intermediate point of unknown type, and the first set of classification models is utilized to identify an intermediate point type of the discovered intermediate point based on the monitored network activity.

In yet another embodiment of the invention, a behavior of a given endpoint of known type in the computer network is monitored. A third set of classification models is utilized to determine an expected behavior of the given endpoint in the computer network based on the monitored behavior of the given endpoint. The monitored behavior is compared with the expected behavior of the given endpoint to determine if the given endpoint is operating correctly or if the given endpoint is configured correctly.

In another embodiment of the invention, machine learning classification is utilized to (i) train one or more classification models in the first set of classification models using training data comprising network activity data that is collected for endpoints of known types, (ii) to train one or more classification models in the second set of classification models using training data comprising data of communication patterns between the endpoints of known types, and (iii) to train one or more classification models in the third set of classification models using training data comprising data of expected behavior of one or more endpoints of known types.

Other embodiments of the invention include, without limitation, apparatus, computer networks, systems and articles of manufacture comprising processor-readable storage media.

DETAILED DESCRIPTION

Figure 1:
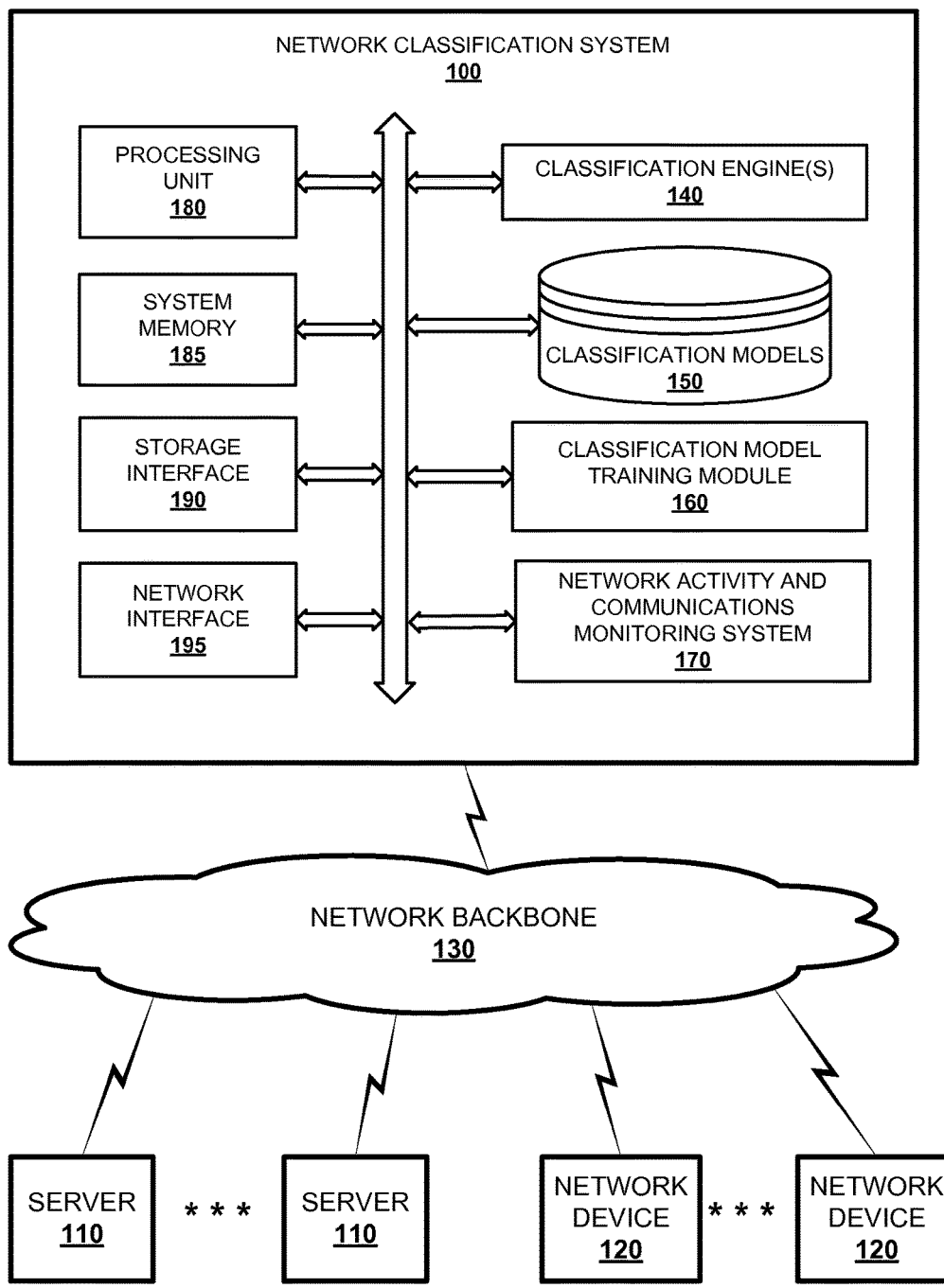
FIG. 1 illustrates a computing system which implements a network classification system according to an embodiment of the invention.

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices such as a data center or private or public enterprise network. Moreover, the phrases "computing system" and "data storage system" as used herein are intended to be broadly construed, so as to encompass, for example, private or public cloud computing or storage systems, as well as other types of systems comprising distributed virtual and/or physical infrastructure.

In accordance with embodiments of the invention, a computer network comprises "endpoints" and "intermediate points." The term "endpoint" as used herein refers to any network entity (e.g., physical entity, logical entity, virtual entity, etc.) which comprises, or which is part of, a computing node at one end of a network communication link (e.g., a transport layer connection). An endpoint can be, for example, a computing node that generates a message (e.g., source node) or a computing node that is a target recipient of a message (e.g., destination node). By way of specific example, endpoints can include application servers, data storage servers, and other types of servers or computing nodes that communicate with each other over a network.

The term "intermediate point" as used herein refers to any network entity (physical entity, logical entity, virtual entity, etc.) which comprises, or which is part of, a computing node that is part of a network communication route or path between two or more communicating endpoints. An intermediate point can be, for example, a router, a switch, a bridge, a gateway, an access point, etc., or other types of computing nodes that form a part of a communication path or route between two other points (e.g., two endpoints, two intermediate points, or an endpoint and another intermediate point). In other words, intermediate points provide switching, routing and forwarding functions, for example, to transmit data packets or messages from point to point.

The term "endpoint type" as used herein refers to a type of network entity of a given endpoint. For instance, an endpoint can be a network entity such as a server, and the server can be a certain type of server, e.g., web application server, data storage server, etc. Moreover, a given type of server such as a data storage server can, in turn, be a certain type of data storage server such as NSS (Network Storage Server) or a Hadoop Distributed File System (HDFS), for example. Moreover, while two endpoints may be of the same general type (e.g., application server type), the two endpoints can be utilized in different manners (e.g., provide different services), or can execute different application platforms (e.g., different hypervisors), or can be configured differently or otherwise behave differently. In this regard, it is to be understood that in accordance with embodiments of the invention, there is no restriction on the level of granularity to which endpoint types can be defined.

Similarly, the term "intermediate point type" as used herein refers to a type of network entity of a given intermediate point. For example, an intermediate point type can be a router, a switch, a bridge, or a gateway, for example. Moreover, an intermediate point type can be further delineated to be a given type of router, a given type of switch, or a given type of bridge, wherein the given type can vary based on the software and/or hardware configuration, for example. In this regard, it is to be understood that in accordance with embodiments of the invention, there is no restriction on the level of granularity to which intermediate point types can be defined.

Moreover, the term "network entity type" as used herein generally refers to a type of entity of a given network entity, irrespective of whether the given network entity is an endpoint or intermediate point, for example.

FIG. 1 illustrates a computing system 10 which implements a network classification system according to an embodiment of the invention. More specifically, FIG. 1 illustrates a computing system 10 comprising a network classification system 100, a plurality of servers 110, and a plurality of network devices 120. The servers 110 and network devices 120 communicate over a network 130, and can be considered "endpoints" as defined above. The network devices 120 may comprise, for example, client devices, network appliances or other types of network devices, in any combination. Such devices are examples of what are more generally referred to herein as "processing devices."

The network 130 may comprise, for example, a global computer network such as the Internet, a wide area network (WAN), a local area network (LAN), a satellite network, a telephone or cable network, a cellular network, a wireless network such as a Wi-Fi or WiMAX network, or various portions or combinations of these and other types of networks. The network 130 in some embodiments therefore comprises combinations of multiple different types of communications networks each comprising network devices configured to communicate using Internet Protocol (IP) or other related communication protocols. The network 130 is considered to include intermediate points (such as routers, switches, etc.) and other elements that form a network backbone to establish communication paths and enable communication between endpoints.

In one embodiment of the invention, the servers 110 and network devices 120 comprise application servers and data storage servers that are configured to perform data computing and storage functions that support one or more network applications and/or on-line services, for example. The computing system 10 may be implemented in one or more data centers, associated with a private or public entity. In one embodiment, at least a subset of the servers 110 and the network devices 120 comprise respective computers associated with a company, organization or other enterprise. Numerous other operating scenarios involving a wide variety of different types and arrangements of one or more processing devices are possible, as will be appreciated by those skilled in the art.

In another embodiment, the computing system 10 depicted in FIG. 1 may be comprised of a plurality of virtual machines (VMs) that are implemented using a hypervisor. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices. An example of a commercially available hypervisor platform that may be used to implement portions of the computing system 10 in one or more embodiments of the invention is the VMware® vSphere™ which may have an associated virtual infrastructure management system such as the VMware® vCenter™. The underlying physical infrastructure may comprise one or more distributed processing platforms that include storage products such as VNX® and Symmetrix VMAX®, both commercially available from EMC Corporation (Hopkinton, Mass.). A variety of other storage products may be utilized to implement at least a portion of the computing system 10 of FIG. 1.

As further shown in FIG. 1, the network classification system 100 comprises one or more classification engines 140, a data store of classification models 150, a classification model training module 160, a network activity and communications monitoring system 170, a processing unit 180, a system memory 185, a storage interface module 190, and a network interface module 195. In one embodiment of the invention, the network classification system 100 is configured to utilize machine learning classification methods to identify unknown entity types (e.g., identify unknown types of endpoints and intermediate points) within the computing system 10, to determine the topology of the computing system 10, and to provide support for other network management functions as described in further detail below.

More specifically, the network activity and communications monitoring system 170 is configured to collect network information (e.g., network attributes/features of network entities and network communications) by monitoring network activity in the computing system 10, monitoring communication patterns between different network entities in the computing system 10, and monitoring behaviors of network entities in the computing system 10. In one embodiment of the invention, the collected network information is utilized by the classification model training module 160 as training data to train and update the classification models 150 using machine learning classification methods. In another embodiment of the invention, the classification engines 140 process the collected data using the classification models 150 identify unknown entity types within the computing system 10, to determine the topology of the computing system 10, and to implement other network management functions as described in further detail below. In one embodiment of the invention, the network activity and communications monitoring system 170 utilizes passive network monitoring techniques or deep packet inspection techniques, for example, to collect the network data that is used for classification.

In one embodiment of the invention as shown in FIG. 1, the network classification system 100 is implemented on one computing node connected to the network 130. In another embodiment of the invention, the network classification system 100 is implemented on a plurality of computing nodes, or the functional modules thereof are otherwise distributed over a plurality of computing nodes connected to the network 130. Indeed, depending on the size of the network and the given application(s) of the computing system being monitored, the network classification system 100 is placed at one or more strategic points within the given network 130 to monitor network activity and communication patterns between the various servers 110 and network devices 120 on the network 130. For each computing node in which a network classification system 100, or portions thereof, is deployed, the computing node will have at least one processor and an associated memory, and will implement one or more functional modules for performing the functions of the network classification system 100.

The processing unit 180 comprises one or more of a computer processor, a microprocessor, a microcontroller, an application-specific integrated circuit (ASIC), a field programmable gate array (FPGA) or other type of processing circuitry, as well as portions or combinations of such circuitry elements. Furthermore, the system memory 185 comprises electronic memory such as random access memory (RAM), read-only memory (ROM) or other types of memory, in any combination. The system memory 185 stores one or more software programs having instructions that are read and processed by the processing unit 180 to instantiate, or otherwise implement, various functions or modules associated with the network classification system 100. In other embodiments, the various functions or modules associated with the network classification system 100 can be implemented in software, hardware, firmware, or using special purpose ASICS (application specific integrated circuits).

The system memory 185 (and other storage devices described herein) having such program code tangibly embodied thereon is an example of what is more generally referred to herein as a processor-readable storage medium. Other examples of processor-readable storage media embodying program code include, for example, optical or magnetic disks. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein is understood to specifically exclude transitory, propagating signals.

In one embodiment of the invention, the network interface module 195 is implemented using software and hardware, which is configured to interface and communicate with the network 130 and other components of the computing system 10. The network interface module 195 may comprise conventional transceivers of a type well known in the art.

The storage interface module 190 is configured to enable the network classification system 100 to interface with storage devices and control the storage of user data and application data which is used to perform network classification functions. The storage interface module 190 utilizes one or more of the storage control protocols to read, write and otherwise access data in persistent storage devices (e.g., classification models data store 150) such as flash memory devices, DAS (direct attached storage) devices, NAS (network-attached storage) devices, etc., depending on the storage system utilized. For example, the storage control protocols may include known protocols such as NFS (network file system) and HDFS (Hadoop Distributed File System) protocols, for example.

The classification models data store 150 (and other storage devices) associated with the network classification system 100 may comprise, for example, storage products such as VNX® and Symmetrix VMAX®, both commercially available from EMC Corporation of Hopkinton, Mass. A variety of other storage products may be utilized to implement at least a portion of the storage devices.

Also associated with the network classification system 100 are input-output devices, which illustratively comprise keyboards, displays or other types of input-output devices in any combination. Such input-output devices are used to support one or more user interfaces to the network classification system 100, as well as to support communication between the network classification system 100 and other related systems and devices not explicitly shown. In some embodiments, the network classification system 100 is a part of or otherwise associated with another system, such as, for example, a security operations center (SOC) or a critical incident response center (CIRC). Additionally or alternatively, the network classification system 100 can be part of or incorporate an otherwise conventional security analytics system, such as the RSA Security Analytics system commercially available from RSA, The Security Division of EMC Corporation of Hopkinton, Mass. Other embodiments can implement the network classification system 100 as part of or in conjunction with a security information and event management (SIEM), such as the enVision® platform, also commercially available from RSA. In one embodiment of the invention, the network classification system 100 is configured to automatically detect the presence of network entities and connections between such network entities (e.g., storage servers and clients), as well as classify network traffic and activity, and thereby collect information that can be used to identify security anomalies or other rare events that may require review by a given security system.

Figure 2:
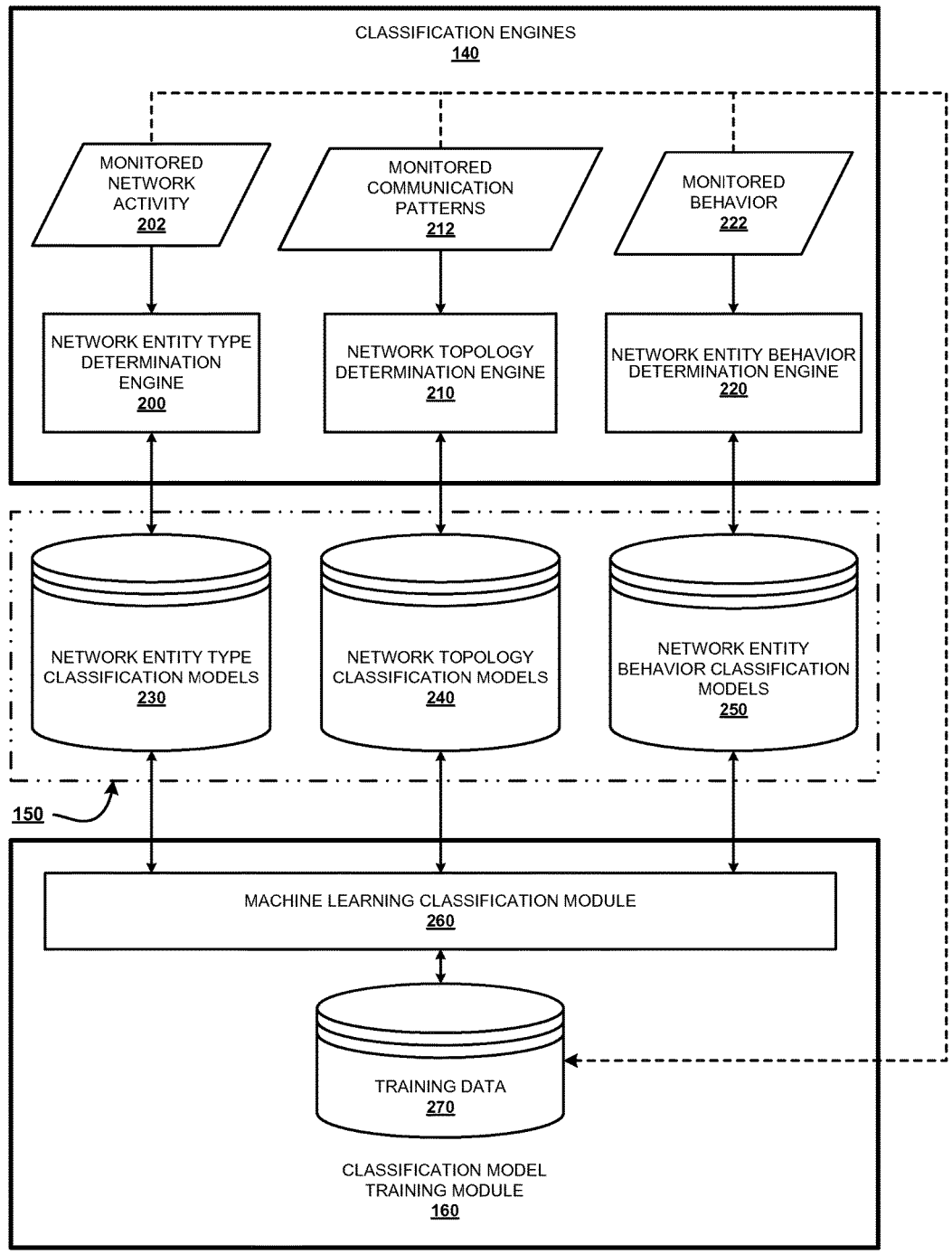
FIG. 2 illustrates a detailed implementation of the network classification system of FIG. 1, according to an embodiment of the invention.

FIG. 2 illustrates a detailed implementation of the network classification system 100 of FIG. 1, according to an embodiment of the invention. As shown in FIG. 2, the classification engines 140 include a network entity type determination engine 200, a network topology determination engine 210, and a network entity behavior determination engine 220. The classification models 150 include network entity type classification models 230, network topology classification models 240, and network entity behavior classification models 250. The classification model training module 160 comprises a machine learning classification module 260 and a data store of training data 270.

As further shown in FIG. 2, the network entity type determination engine 200 receives monitored network activity data 202 which is collected by the network activity and communications monitoring system 170. The network entity type determination engine 200 processes the monitored network activity data 202 to discover the presence of one or more network entities having unknown types, and then identify a network entity type of the discovered network entity utilizing one or more trained network entity type classification models 230.

For example, in one embodiment of the invention, the network entity type classification models 230 include models that are trained to determine different endpoint types. The different endpoint types include different types of servers such as storage servers or other application-specific servers, for example. As noted above, the level of granularity for identifying different types of network entities can vary. For example, two servers may be similar types of network entities in the sense that they are similar types of data storage servers, but different types of network entities in the sense that they are configured differently or implement certain functions that are different. By way of further example, similar types of servers can be deemed different network entity types if, for example, one server hosts a hypervisor platform and the other server does not host a hypervisor platform, or if the two similar types of servers host different types of hypervisors. In addition, the network entity type classification models 230 include models that are trained to determine different types of intermediate points.

In addition, the network topology determination engine 210 receives monitored communication patterns data 212 which is collected by the network activity and communications monitoring system 170. The monitored communication patterns data 212 comprises information regarding patterns of communication between multiple network entities in the computing system 10. The network topology determination engine 210 processes the monitored communication patterns data 212 utilizing one or more trained network topology classification models 240 to determine a logical topology of the computing system 10.

In one embodiment of the invention, the logical topology which is determined by the network classification system 100 represents physical/logical/virtual connections between known network entities currently operating at a given time in the computing system 10. In another embodiment of the invention, the logical topology which is determined by the network classification system 100 represents a collection of interdependent services or functions provided/supported by network entities of the computing system 10. In another embodiment of the invention, the logical topology which is determined by the network classification system 100 represents a collection of resources that are utilized by known network entities currently operating at a given time in the computing system 10.

In another embodiment of the invention, the network topology determination engine 210 processes the monitored communication patterns data 212 utilizing one or more trained network topology classification models 240 to identify one or more latent dependencies between network entities of known types in the computing system, for example. The ability to automatically extract information regarding the network topology and dependencies between constituent network entities enables the implementation of an intelligent data center management system which can be utilized to prevent the occurrence of faults, or otherwise help recover from faults, in the computing network 10.

Furthermore, the network entity behavior determination engine 220 receives monitored behavior data 222 which is collected by the network activity and communications monitoring system 170. The monitored behavior data 222 comprises information that is indicative of behavioral characteristics of network entities operating in the computing system 10. The network entity behavior determination engine 220 processes the monitored behavior data 222 utilizing one or more trained network entity behavior classification models 250 classify the behavior of a known network entity (currently operating in the computing system 10) as meeting (or not meeting) an expected behavior.

In particular, in one embodiment of the invention, the network entity behavior classification models 250 are trained to recognize expected behaviors of known network entities operating in a given computing system. The network entity behavior determination engine 220 can apply the monitored behavior data 222 of a given network entity to one more models to determine if the behavior data fits to one or more models of expected behavior. By comparing the monitored behavior data 222 with the expected behavior of a given network entity, the network entity behavior determination engine 220 can determine whether or not the given network entity is operating correctly or is configured correctly.

In one embodiment of the invention, the machine learning classification module 260 is configured to train the classification models 150 using any suitable well-known supervised classification techniques, for example. The machine learning classification module 260 trains the classification models 150 using training data that is persistently stored in the data store of training data 270. For example, in one embodiment of the invention, the machine learning classification module 260 can train the set of classification models 150 using a supervised training process as follows. Initially, network activities and behaviors of various known types of network entities (e.g., endpoints and intermediate points) is monitored and collected. The collected information is utilized to generate a labeled training data set and a validation data set. Classification models are then created by fitting machine learning classification models to the labeled training data. The classification models are then tested using the validation data set. The classification models are then operationalized to analyze production network characteristic data. The supervised training process can be repeated to retrain and optimize the classification models using updated data sets.

In accordance with embodiments of the invention, the network entity type classification models 230 can be trained using training data comprising network activity data that is collected for network entities of known types. The network topology classification models 240 can be trained using training data comprising data of communication patterns between network entities of known types. In addition, the network entity behavior classification models 250 can be trained using training data comprising data of expected behavior of network entities of known types.

In another embodiment of the invention, static rule-based pattern matching techniques can be applied to identify types of network entities, for example, from observed network activity. However, the use of machine learning classification techniques provides a more robust approach along with a number of advantages over rule-based pattern matching methods. For example, after the initial classification models 150 are created, unsupervised machine learning techniques can be applied to automatically update the classification models 150 based on additional discriminating network attributes or features that are automatically identified and utilized for optimizing the classification models 150. For example, during real-time operation of the computing system 10, as depicted by the dashed arrows in FIG. 2, the monitored data 202, 212, 222, can be persistently stored in the training data store 270 and subsequently utilized in an unsupervised or supervised classification model training process to optimize existing classification models 150, or otherwise build new classification models.

In addition, supervised and/or unsupervised machine learning classification techniques can be applied to adapt the classification models 150 to variations in profiles of network entities or otherwise construct new classification models over time. With regard to unsupervised machine learning algorithms, as is known in the art, unsupervised machine learning can rely on training data to build a classification model to which newly acquired data is applied. However, unsupervised machine learning utilizes clustering techniques to cluster similar data or features, and does not rely on pre-defined labels to perform actual training and classification. Another advantage to using machine learning classification is that the classification models 150 can accommodate single systems providing multiple, disparate services. Moreover, the classification models 150 can provide a likelihood estimate rather than a binary "yes" or "no" classification.

The classification models 150 are trained on various types of network attributes or features that are indicative of certain types of network activity and network communications. In one embodiment, the network attributes or features that are selected for classification are network attributes/features which provide uniquely identifiable characteristics or features that would effectively enable the classification of different types of network entities and their behaviors. By way of example, the network attributes that are monitored and used for training classification models comprise network communication attributes and features associated with the OSI (Open Systems Interconnection) model of network communication. As is known in the art, the OSI model divides network communication into a stack comprising seven layers (Layers 1-7), wherein each layer performs specific functions and passes data to other layers in the OSI stack.

In particular, Layer 1 of the OSI stack is referred to as the "physical" layer. The physical layer comprises wiring, fiber, network cards, and other physical elements for transmitting data streams. In addition, Layer 2 of the OSI stack is referred to as the "data link" layer. The data link layer is configured to encode and decode data packets into bits. Ethernet is a common technology used for the physical and data link layers. An Ethernet network comprises point-to-point links between computer systems and switches. Computer systems connected to an Ethernet network are identified by a 48-bit identifier called a MAC address. Messages between computer systems are sent as one or more packets called frames. Each frame contains the source and destination MAC addresses. Switches inspect frames, determine the targeted recipient, and transmit the frame on the appropriate link. Each frame also contains an EtherType field that defines the protocol being used.

Next, Layer 3 of the OSI stack is referred to as the "network" layer. The network layer provides switching, routing and addressing functions, for example, to transmit data from node to node. The Internet Protocol (IP) is a common technology used for the network layer. Similar to Ethernet, computer systems communicate through the IP protocol by exchanging packets of information encapsulated in the payload of Ethernet frames. Each IP packet contains 32 bit (IPv4) or 128 bit (IPv6) addresses identifying source and destination computers. IP packets also contain a protocol field identifying the particular protocol being used.

In addition, the Address Resolution Protocol (ARP) is a network layer protocol used to convert an IP address into a physical address, such as an Ethernet address. For example, the ARP protocol provides a way to determine the appropriate MAC address to send an IP packet given its destination address. If the destination is on the same Ethernet network, ARP provides its MAC address. If, however, the destination is on another Ethernet network, the MAC address of a router is provided. Like Ethernet switches, IP routers inspect the destination addresses in IP packets and direct them to the appropriate network. Routers communicate with each other using the Border Gateway Protocol (BGP) and other protocols to build routing tables that describe how to transfer IP packets between widely separated Ethernet networks. The links between routers are typically called "trunks."

Further, Layer 4 of the OSI stack is referred to as the "transport" layer. The transport layer is configured to transfer data between end systems, or hosts, and is responsible for end-to-end error recovery and flow control. For example, the Transmission Control Protocol (TCP) and User Datagram Protocol (UDP) are typical transport layer technologies. Each TCP and UDP packet contains 16 bit source and destination port identifiers that uniquely identify a particular connection between two systems when combined with the source and destination addresses from the IP packets that encapsulate them.

Next, Layer 5 of the OSI stack is referred to as the "session" layer. The session layer is configured to establish, manage and terminate connections and sessions between applications. The session layer sets up, coordinates, and terminates conversations, exchanges, and dialogues between the applications at each end. Further, Layer 6 of the OSI stack is referred to as the "presentation" layer. The presentation layer is configured to translate data between application and network format. For example, the presentation layer formats and encrypts data to be sent across a network.

Finally, Layer 7 of the OSI stack is referred to as the "application" layer. The application layer is configured to support application-specific and end-user processes. The application layer provides application services for, e.g., file transfers, e-mail, and other network software services. The application layer implements a Domain Name System (DNS) service. As is known in the art, a DNS service is a distributed network service that enables the association of a human readable name to a numerical IP address. DNS uses a hierarchical database distributed across many network connected computers to efficiently store and query the mappings between names and IP addresses. To use the DNS system, a network connected computer system must know the address of an initial Name Server to query. The Name Server can either provide a partial result indicating the next Name Server to query or can provide a full result after performing the recursive lookup in cooperation with other, more authoritative Name Servers. DNS can be configured to associate multiple IP addresses with a single name. This capability can be used to distribute network service requests across a set of computers using, e.g., load balancing techniques. A given set of load balancing systems can either be independent (for stateless services) or clustered (for statefull services).

In accordance with embodiments of the invention, the specific configuration of one or more of the OSI layers for a given network entity (e.g., endpoint) can provide a unique set of identifiable characteristics or features that enable classification of the entity type of the given network entity. It is to be understood that the term endpoint or network entity as used herein is intended to encompass all applicable layers of the OSI stack.

Figure 3:
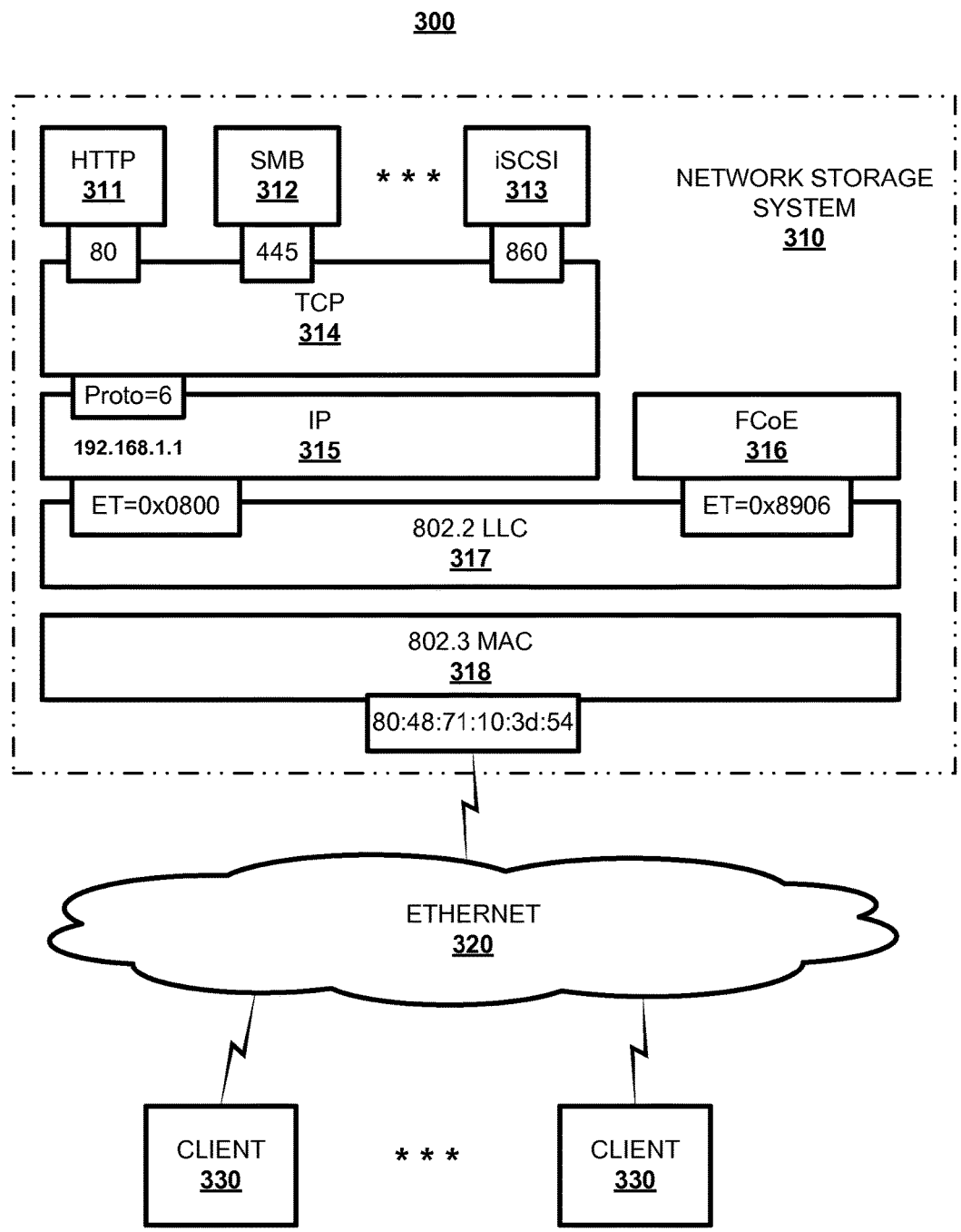
FIG. 3 illustrates an example of a network entity having network attributes that can be utilized to identify a network entity type of the network entity using the network classification system of FIG. 1, according to an embodiment of the invention.

FIG. 3 illustrates an example of a network entity having network attributes that can be utilized to identify a network entity type of the network entity using the network classification system of FIG. 1, according to an embodiment of the invention. In particular, FIG. 3 illustrates a computer network 300 comprising a Network Storage System (NSS) 310 (e.g., endpoint) and an Ethernet connection 320 between the NSS 310 and a plurality of clients 330. In the example embodiment, the NSS 310 provides web services via Hypertext Transfer Protocol (HTTP) 311, file services such as SMB (server message block) 312, and block services such as Internet Small Computer System Interface (iSCSI) 313, and Fibre Channel over Ethernet (FCoE) 316. The HTTP 311, SMB 312, and iSCSI 313 protocols execute on top of a transfer control protocol (TCP) layer 314, and listing on ports 80, 445, and 860 respectively. The TCP layer 314 communicates with an Internet Protocol (IP) layer 315 using a Protocol value of 6. The IP layer 315 is configured with the IP address 192.168.1.1 and communicates with an Ethernet Logical Link Control (LLC) layer 317 using an EtherType (ET) value of 0x0800. The FCoE protocol 316 bypasses the TCP/IP stack 316/315 for efficiency and communicates directly to the Ethernet LLC layer 317 using an EtherType (ET) of 0x8906. An Ethernet Medium Access Control (MAC) layer 318 uses a MAC address of 80:48:71:10:3d:54 to send and receive packets on the physical Ethernet network 320. The clients 330 (e.g., networked computers) communicate with the NSS 310 to use one or more services of the NSS 310.

In accordance with an embodiment of the invention, the NSS 310 comprises various distinctive network attributes that can be utilized to train and utilize classification models configured to identify data storage servers. For example, with regard to TCP services, the NSS 310 responds to requests directed to the TCP ports associated with the HTTP 311, SMB 312, and iSCSI 313 protocols. Furthermore, with regard to EtherTypes, the NSS 310 sends/receives packets using the EtherType of the FCoE protocol 316. Moreover, the NSS 310 communicates with multiple clients, providing a relatively large "fan-in". Another distinctive attribute of the NSS 310 is with regard to connection direction, wherein the NSS 310 typically receives TCP connection requests but rarely initiates them. Further, with regard to bandwidth, the NSS 310 may send/receive an abnormally greater amount of data. In addition, with regard to latency, the NSS 310 may take an abnormally smaller or greater amount of time to respond to requests based on the storage media used and the system's utilization.

Collectively, the combination of exemplary attributes noted above can be used to identify the NSS 310 from data collected through passive network monitoring or deep packet inspection or other suitable techniques implemented by the network activity and communications monitoring system 170. It is to be understood that the above mentioned NSS attributes are meant to be illustrative, and not exhaustive, of all the attributes and characteristics and behaviors by which an unknown network entity may be identified as a network storage system from observed network communications. The network attributes discussed herein are generalizable to identifying other types of network entities.

For example, the following TABLE 1 provides an exemplary list of network attributes that can be specified as identifiable characteristics that are utilized to train classification models that are used to identify network servers using machine learning classification models in accordance with embodiments of the invention.

TABLE 1

| CLASS | ATTRIBUTES |
|---|---|
| Physical Connection | Trunk Port |
| Packet Contents | MAC Address |
| | Field |
| | IP Address |
| | IP Protocol |
| | TCP/UDP Ports |
| Behaviors | Connection Direction |
| | Bandwidth Profile |
| | Fan In/Fan Out |
| | DNS Resolutions |

More specifically, as shown in TABLE 1 above, different classes of attributes can be utilized to identify network entities from observed network activity. For example, such attribute classes generally include physical connection attributes, packet content attributes, and behavior attributes. For example, a physical connection class can include a trunk port attribute, wherein a trunk is a physical path or link in a communications system that is known to handle multiple simultaneous transmission and interconnections between nodes. The packet contents class of attributes can include attributes that provide unique identifiable characteristics of network entities based on the content of various packet fields. Moreover, the behavior class of attributes can include attributes that provide identifiable behavioral characteristics of certain network entities.

Figure 4:
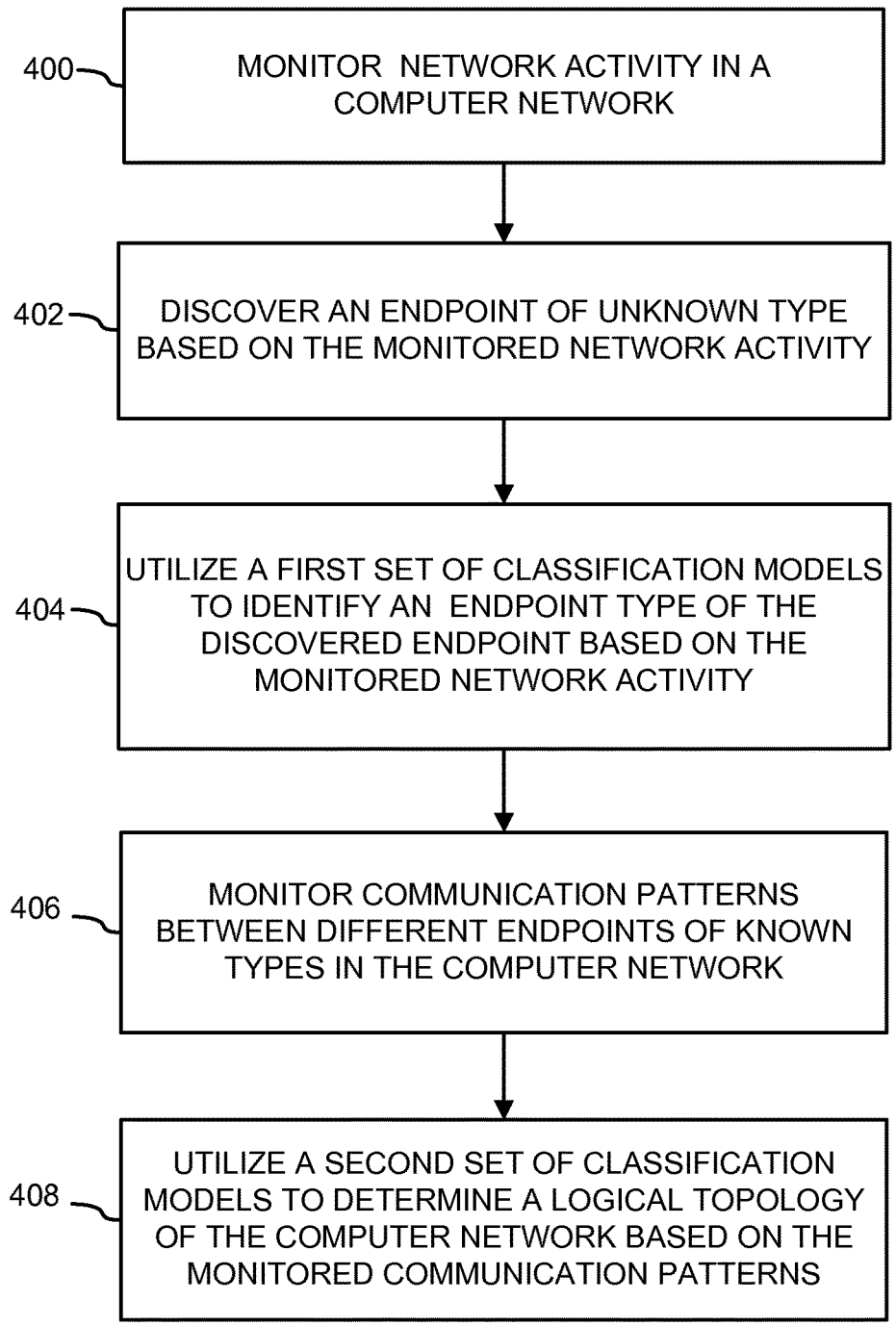
FIG. 4 is a flow diagram of method for utilizing a classification system to identify network entity types and determine computer network topologies, according to an embodiment of the invention.

FIG. 4 is a flow diagram of method for utilizing a classification system to identify network entity types and determine computer network topologies, according to an embodiment of the invention. In particular, in one embodiment of the invention, FIG. 4 illustrates a mode of operation of the network classification system 100 of FIGS. 1 and 2. Accordingly, for purposes of illustration, the flow diagram of FIG. 4 may be further discussed in the context of the embodiments shown in FIGS. 1 and 2.

Referring to FIG. 4, the method comprises monitoring network activity in a computer network (block 400). In one embodiment of the invention, the network activity and communications monitoring system 170 (FIG. 1) is configured to operate on one or more nodes of a given computer network to collect network activity data. The network classification system 100 is configured to discover an endpoint of unknown type based on the monitored network activity (block 402), and a first set of classification models is utilized to identify an endpoint type of the discovered endpoint based on the monitored network activity (block 404). For example, in one embodiment of the invention, the network entity type determination engine 200 (FIG. 2) is configured to process monitored network activity data 202 to discover the presence of, e.g., an endpoint of unknown type, and then identify an endpoint type of the discovered endpoint utilizing one or more trained network entity type classification models 230.

The method further comprises monitoring communication patterns between different endpoints of known types in the computer network (block 406). In one embodiment of the invention, the network activity and communications monitoring system 170 (FIG. 1) is configured to operate on one or more nodes of a given computer network to collect data regarding communication patterns between endpoints of known types. The network classification system 100 is configured to utilize a second set of classification models to determine a logical topology of the computer network based on the monitored communication patterns (block 408). For example, in one embodiment of the invention, as discussed above, the network topology determination engine 210 is configured to process monitored communication patterns data 212 utilizing one or more trained network topology classification models 240 to determine a logical topology of the computer network.

As noted above, classification methods are utilized in computer networks to discover and identify previously unknown network entities, such as network storage systems and other types of entities, through observing network activity and applying classification models that are built using a representative training set. This capability would greatly simplify the introduction of intelligent data center management capabilities to existing, large, complex data centers.

Moreover, classification methods are utilized for validation of computer networks. For example, for new data center deployments, classification methods as discussed herein can be used to compare observed and expected network activity to independently verify the correct configuration and operation of network entities, such as network storage systems. This capability simplifies and accelerates the detection of configuration issues when configuring new data center environments.

In addition, classification methods according to embodiments of the invention can be used to monitor the status of operational data centers through continuously observing network activity and applying classification models. This capability would simplify the management of large, complex data centers and reduce the time required to detect anomalies.

Moreover, advanced classification modeling techniques would enable identification of highly available redundant connections between clients and storage systems, identification of constituent storage processors of a highly available scale-up storage system, and/or identification of nodes in a load-balancing scale-out storage system. The use of classification methods to discover such relationships and systems would enable the implementation of an intelligent data center management system with a more robust and detailed understanding of the storage environment.

In other embodiments of the invention, classification methods that enable the automated discovery of network storage systems could enable and support automated storage resource allocation. For example, classification methods according to embodiments of the invention could be used to provide real-time determination of information such as storage system load, and quality of service, wherein such information could be used to implement a resource allocation system configured to automatically select an optimal network storage system to allocate resources from and, thus, obtain a desired level of service.

It is to be understood that embodiments of the invention can be utilized to identify various types of network entities including, but not limited to, network gateways, routers, application servers (e.g., databases), hypervisors hosting virtualized applications, etc. The use of classification methods with such a variety of network entities would enable the implementation of an intelligent data center management system with a more robust understanding of the environment.

Furthermore, as noted above, classification methods according to embodiments of the invention are configured for discovering network topologies. Again, using multiple classification models, methods are implemented to identify the communication patterns between multiple network entities and establish, e.g., the logical topology of systems, services, etc., as well as identify latent dependencies between these network entities. Again, the ability to understand the topology and complex dependencies between network entities within a computing system would enable the implementation of an intelligent data center management system that could provide a detailed understanding of such complex environments and automatically implement methods that could prevent faults or otherwise help recover from faults.

It is to be understood that the particular functionality, structures, and processing operations described in conjunction with FIGS. 1, 2, 3, and 4 are presented by way of illustrative example only, and should not be construed as limiting the scope of the invention in any way. Alternative embodiments can use other types of processing operations and modules to implement the functions described with reference to the modules of FIGS. 1, 2 and 3, and the flow diagram of FIG. 4. For example, the ordering of the process steps may be varied in other embodiments, or certain steps may be performed concurrently with one another rather than serially. Moreover, although described in the context of particular system and device configurations, the classification techniques are applicable to a wide variety of other types of information processing systems, computing systems, data storage systems, processing devices and distributed virtual infrastructure arrangements. Moreover, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:

monitoring network activity in a computer network;

discovering endpoints of unknown endpoint types in the computer network based on the monitored network activity, wherein the discovered endpoints comprise physical, logical, and virtual entities that communicate over the computer network;

utilizing a first set of classification models to identify an endpoint type of each of the discovered endpoints based on the monitored network activity, wherein the first set of classification models comprises classification models that are configured to learn to identify unknown endpoint types in the computer network using the monitored network activity in the computer network;

monitoring communication patterns between different endpoints of known types operating in the computer network, wherein the different endpoints of known types comprise the endpoints with identified endpoint types; and utilizing a second set of classification models to determine a logical topology of the computer network based on the monitored communication patterns, wherein the logical topology represents physical, logical, and virtual connections between the different endpoints of known types operating in the computer network;

wherein the monitoring, discovering, and utilizing steps are performed by at least one processing device comprising a processor coupled to a memory.

2. The method of claim 1 wherein the different endpoint types include storage servers.

3. The method of claim 1 wherein the different endpoint types include servers with hypervisors hosted by the servers.

4. The method of claim 1 further comprising utilizing the second set of classification models to identify a latent dependency between the different endpoints of known types operating in the computer network.

5. The method of claim 1 further comprising:
discovering an intermediate point of unknown type based on the monitored network activity; and
utilizing the first set of classification models to identify an intermediate point type of the discovered intermediate point based on the monitored network activity.

6. The method of claim 5 wherein the intermediate point comprises a router or a gateway.

7. The method of claim 1 further comprising:
monitoring behaviors of the different endpoints of known types operating in the computer network;
utilizing a third set of classification models to determine expected behaviors of the different endpoints of known types operating in the computer network based on the monitored behaviors of the different endpoints of known types operating in the computer network; and
comparing the monitored behaviors with the expected behaviors of the different endpoints of known types operating in the computer network to determine if the different endpoints of known types are operating correctly or if the different endpoints of known types are configured correctly.

8. The method of claim 7, further comprising:
training one or more classification models in the first set of classification models using training data comprising data of the monitored network activity that is collected for the different endpoints of known types operating in the network;
training one or more classification models in the second set of classification models using training data comprising data of the monitored communication patterns between the different endpoints of known types operating in the network; and
training one or more classification models in the third set of classification models using training data comprising data of the expected behaviors of one or more of the different endpoints of known types operating in the network.

9. An article of manufacture comprising a non-transitory processor-readable storage medium having stored therein program code of one or more software programs, wherein the program code when executed by at least one processing device causes said at least one processing device:
to monitor network activity in a computer network;
to discover endpoints of unknown endpoint types in the computer network based on the monitored network activity, wherein the discovered endpoints comprise physical, logical, and virtual entities that communicate over the computer network;
to utilize a first set of classification models to identify an endpoint type of each of the discovered endpoints based on the monitored network activity, wherein the first set of classification models comprises classification models that are configured to learn to identify unknown endpoint types in the computer network using the monitored network activity in the computer network;
to monitor communication patterns between different endpoints of known types operating in the computer network, wherein the different endpoints of known types comprise the endpoints with identified endpoint types; and
to utilize a second set of classification models to determine a logical topology of the computer network based on the monitored communication patterns, wherein the logical topology represents physical, logical, and virtual connections between the different endpoints of known types operating in the computer network.

10. The article of manufacture of claim 9, wherein the program code when executed by the at least one processing device further causes said at least one processing device:
to monitor behaviors of the different endpoints of known types operating in the computer network;
to utilize a third set of classification models to determine expected behaviors of the different endpoints of known types operating in the computer network based on the monitored behaviors of the different endpoints of known types operating in the computer network; and
to compare the monitored behaviors with the expected behaviors of the different endpoints of known types operating in the computer network to determine if the different endpoints of known types are operating correctly or if the different endpoints of known types are configured correctly.

11. The article of manufacture of claim 10 wherein the program code when executed by the at least one processing device further causes said at least one processing device:
to train one or more classification models in the first set of classification models using training data comprising data of the monitored network activity that is collected for the different endpoints of known types operating in the network;
to train one or more classification models in the second set of classification models using training data comprising data of the monitored communication patterns between the different endpoints of known types operating in the network; and
to train one or more classification models in the third set of classification models using training data comprising data of the expected behaviors of one or more of the different endpoints of known types operating in the network.

12. An apparatus comprising:
at least one processing device comprising a processor coupled to a memory, wherein the at least one processing device is configured to process program code stored in the memory to instantiate a network classification module;
wherein the network classification module is configured:
to monitor network activity in a computer network;
to discover endpoints of unknown endpoint types in the computer network based on the monitored network activity, wherein the discovered endpoints comprise physical, logical, and virtual entities that communicate over the computer network;
to utilize a first set of classification models to identify an endpoint type of each of the discovered endpoints based on the monitored network activity, wherein the first set of classification models comprises classification models that are configured to learn to identify unknown endpoint types in the computer network using the monitored network activity in the computer network;

to monitor communication patterns between different endpoints of known types operating in the computer network, wherein the different endpoints of known types comprise the endpoints with identified endpoint types; and to utilize a second set of classification models to determine a logical topology of the computer network based on the monitored communication patterns, wherein the logical topology represents physical, logical, and virtual connections between the different endpoints of known types operating in the computer network.

13. The apparatus of claim 12 wherein the network classification module is further configured to utilize the second set of classification models to identify a latent dependency between the different endpoints of known types operating in the computer network.

14. The apparatus of claim 12 wherein the network classification module is further configured:

to discover an intermediate point of unknown type based on the monitored network activity; and to utilize the first set of classification models to identify an intermediate point type of the discovered intermediate point based on the monitored network activity.

15. The apparatus of claim 12 wherein the network classification module is further configured:

to monitor behaviors of the different endpoints of known types operating endpoint of known type in the computer network;

to utilize a third set of classification models to determine expected behaviors of the different endpoints of known types operating in the computer network based on the monitored behaviors of the different endpoints of known types operating in the computer network; and to compare the monitored behaviors with the expected behaviors of the different endpoints of known types operating in the computer network to determine if the different endpoints of known types are operating correctly or if the different endpoints of known types are configured correctly.

16. The apparatus of claim 15 wherein the network classification module is further configured:

to train one or more classification models in the first set of classification models using training data comprising data of the monitored network activity that is collected for the different endpoints of known types operating in the network;

to train one or more classification models in the second set of classification models using training data comprising data of the monitored communication patterns between the different endpoints of known types operating in the network; and to train one or more classification models in the third set of classification models using training data comprising data of the expected behaviors of one or more of the different endpoints of known types operating in the network.

17. A computer network comprising the apparatus of claim 12.

* * * * *